A. SPENCER.
CENTRAL BUFFING AND DRAW GEAR FOR RAILWAY AND LIKE VEHICLES.
APPLICATION FILED FEB. 2, 1914.

1,113,916.  Patented Oct. 13, 1914.

UNITED STATES PATENT OFFICE.

ALEXANDER SPENCER, OF LONDON, ENGLAND.

CENTRAL BUFFING AND DRAW GEAR FOR RAILWAY AND LIKE VEHICLES.

1,113,916.  Specification of Letters Patent.  Patented Oct. 13, 1914.

Application filed February 2, 1914. Serial No. 815,994.

*To all whom it may concern:*

Be it known that I, ALEXANDER SPENCER, a subject of the King of Great Britain and Ireland, residing at London, England, have invented Improvements in Central Buffing and Draw Gear for Railway and like Vehicles, of which the following is a specification.

This invention relates to central buffing and draw gear of the commonly known type usually used in connection with the "M. C. B." coupler. Such gear comprises a central coupling head formed in one with a draw bar and as heretofore usually constructed the buffing and draw springs, which are generally steel springs, have been operated by the rear end of the coupling head and by a yoke or shackle which in some constructions is made in two or three parts and is suitably connected at one end by bolts to the draw bar and at the other end constitutes or is fitted with a bearing member for the spring, each longitudinal portion of the yoke being stepped or provided with a shoulder adapted to engage a corresponding step or shoulder formed therefor on the inner end of the draw bar so that the connecting bolts are relieved of shearing strain.

Now an object of this invention is to provide an improved arrangement whereby, with a divided yoke or shackle of this kind, the springs embraced by the yoke or shackle can be initially compressed sufficiently to enable the yoke to be readily put in position relatively to the draw bar and the bolts to be easily slipped into the bolt holes. For this purpose according to this invention a tail rod, which serves to guide and centralize the springs, is connected at one end to the draw bar and at the other end extends through the inner end of the yoke and is fitted with a nut or nuts adapted to bear against the inner end of the yoke whereby the springs can be initially compressed to the desired extent.

By a yoke arrangement as set forth india rubber springs made of suitable size can be conveniently used. The said tail rod can be formed at one end with a head or with an eye mounted on one of the bolts connecting the yoke to the draw bar end.

Figure 1:
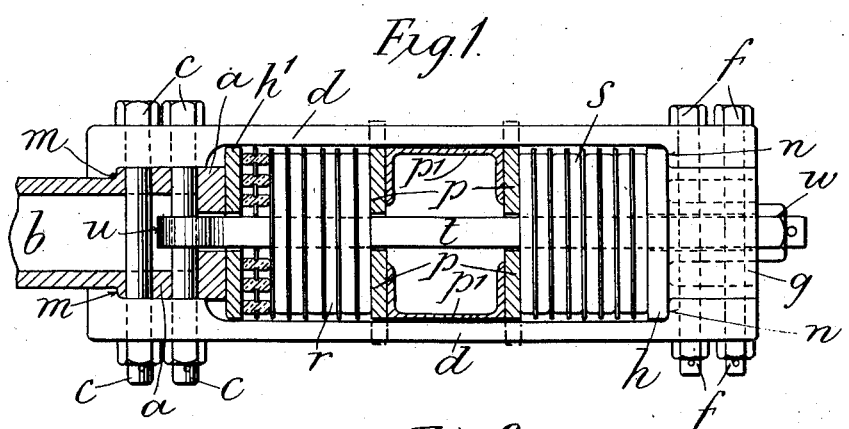
Figure 2:
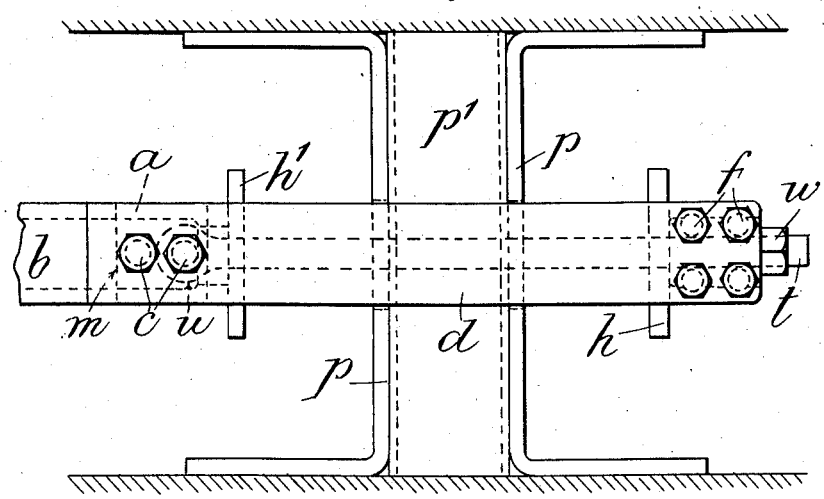

Figure 1 of the accompanying illustrative drawings shows in sectional elevation, and Fig. 2 in plan with the springs removed, one construction of buffing and draw gear according to this invention.

In this construction the end $a$ of the draw rod $b$ is enlarged and formed with two holes for bolts $c$ whereby it is connected to the outer ends of two sides or main members $d$ of a yoke whose inner ends are in like manner connected by four bolts $f$ to an inwardly extending part $g$ of a plate or member $h$ that constitutes the inner end of the yoke and a bearing plate for the spring. The outer end of each yoke side or main member $d$ is stepped or provided with a shoulder $m$ that bears against the enlarged inner end of the draw bar, and the inner end of such yoke side or member is stepped or provided with a shoulder $n$ against which the spring bearing plate $h$ abuts. Midway or approximately midway of the length of the yoke it embraces a member $p$, it may be of channel section connected to the vehicle underframe and that constitutes the abutment for the adjacent ends of the "buffing" and draw springs $r$ and $s$ respectively, or for plates arranged to slide freely within the yoke and form abutments for the adjacent ends of the two springs. The other ends of the springs $r$ and $s$ respectively bear against the draw bar end $a$ or the plate $h^1$ interposed between such end and the spring, and the bearing plate or member $h$ at the rear end of the yoke.

In the buffing and draw gear illustrated the member $p$ consists of two knees fixed to longitudinal members of the vehicle underframe, the two lengths $p^1$ of channel iron connected to the knees and forming bearing surfaces for the yoke members $d$. The springs are threaded on a rod $t$ that is formed at one end with an eye $u$ whereby it is mounted on one of the bolts $c$ connecting the yoke to the draw bar $b$ and the other end of the rod extends through the inner end of the yoke and is there fitted with a nut $w$ whereby the springs $r$ and $s$ can be compressed to the desired extent and to facilitate getting the connecting bolts $c$ in place.

For the purpose of efficiently guiding the yoke the fixed member $p$ may be deeper than as shown and formed with recesses in which the yoke members $d$ can slide, see the dotted lines in both figures of the drawings.

Details of construction can be otherwise than as described without departure from the invention as will be understood, for example the part $g$ through which the connecting bolts $f$ pass can be made separately from the bearing plate $h$; also, instead of separate buffing and draw springs the arrangement can comprise a single column of springs that act both for buffing and draw purposes; moreover, steel springs can be used instead of rubber springs or in some cases the arrangement may comprise both rubber springs and steel springs.

What I claim is:—

In central buffing and draw gear, a draw bar formed with outwardly projecting shoulders near its inner end, two links formed with bolt holes and constituting the sides of a shackle and each having at each end an inwardly projecting portion, the inwardly projecting portions at the outer ends of said links engaging the outwardly projecting shoulders of said draw bar, bolts connecting said links to said draw bar, a rod pivoted at one end to one of said bolts and extending between said links, a fixed member extending between said links and through which said rod extends, a spring threaded on said rod between said fixed member and the end of said draw bar, an abutment block constituting the end of the shackle and formed with bolt holes, a flange on said abutment block adapted to be engaged by the inwardly projecting portions at the inner ends of said links, a spring threaded on said rod between said fixed member and said abutment and tending to force the said flange against the inwardly projecting portions at the inner ends of said links and also tending to force the inwardly projecting portions at the outer ends of said links against the outwardly projecting shoulders of said draw bar, a nut on the end of said rod adapted to bear on said abutment, and bolts extending through the bolt holes of said abutment and the corresponding bolt holes of said links.

Signed at 77–79 Cannon street, London, England this twenty-second day of January 1914.

ALEXANDER SPENCER.

Witnesses:
R. T. CLASCODINE,
J. A. TOUNRY.